US012793184B2

(12) United States Patent
Kim et al.

(10) Patent No.: US 12,793,184 B2
(45) Date of Patent: Nov. 10, 2026

(54) METHOD AND DEVICE WITH IMAGE-DIFFERENCE REDUCTION PREPROCESSING

(71) Applicant: SAMSUNG ELECTRONICS CO., LTD., Suwon-si (KR)

(72) Inventors: Youngdong Kim, Suwon-si (KR); Byungjai Kim, Suwon-si (KR); Jongin Lim, Suwon-si (KR); Seungju Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 18/791,859

(22) Filed: Aug. 1, 2024

(65) Prior Publication Data

US 2025/0045884 A1 Feb. 6, 2025

(30) Foreign Application Priority Data

Aug. 3, 2023 (KR) ........................ 10-2023-0101678

(51) Int. Cl.
*G06T 5/70* (2024.01)
*G06T 5/50* (2006.01)
(Continued)

(52) U.S. Cl.
CPC .................. *G06T 5/70* (2024.01); *G06T 5/50* (2013.01); *G06T 7/0002* (2013.01); *G06T 7/194* (2017.01);
(Continued)

(58) Field of Classification Search
CPC . G06T 2207/20081; G06T 2207/20084; G06T 2207/20212; G06T 2207/30148; G06T 5/50; G06T 5/70; G06T 7/0002; G06T 7/0004; G06T 7/194; G06T 2207/20224; G06V 10/20; G06V 10/40
See application file for complete search history.

(56) References Cited

U.S. PATENT DOCUMENTS 10,572,978 B2 2/2020 Hung
11,741,596 B2 8/2023 Park et al.
(Continued)

FOREIGN PATENT DOCUMENTS

KR 10-2020-0067305 A 6/2020
KR 10-2021-0017651 A 2/2021
(Continued)

OTHER PUBLICATIONS

Zontak, Maria, and Israel Cohen. “Kernel-based detection of defects on semiconductor wafers.” 2009 IEEE international workshop on machine learning for signal processing. IEEE, 2009. (Year: 2009).*
(Continued)

*Primary Examiner* — Michael J Vanchy, Jr.
(74) *Attorney, Agent, or Firm* — NSIP Law

(57) ABSTRACT

Disclosed is a source image preprocessing method and device including: outputting a feature map by applying at least one kernel to a source image; generating a reconstructed source image by applying at least one mask to the feature map that corresponds to the source image; and updating the at least one kernel based on a value of the loss function between the reconstructed source image and a target image.

12 Claims, 11 Drawing Sheets

(51) Int. Cl.
*G06T 7/00* (2017.01)
*G06T 7/194* (2017.01)

(52) U.S. Cl.
CPC ............... *G06T 2207/20081* (2013.01); *G06T 2207/20212* (2013.01)

(56) References Cited

U.S. PATENT DOCUMENTS

| | | | | |
|---|---|---|---|---|
| 2015/0373235 | A1 | 12/2015 | Chiang et al. | |
| 2021/0142448 | A1* | 5/2021 | Yao | G06N 3/04 |

FOREIGN PATENT DOCUMENTS

| | | | |
|---|---|---|---|
| KR | 10-2021-0057518 | A | 5/2021 |
| KR | 10-2022-0167824 | A | 12/2022 |

OTHER PUBLICATIONS

Jiang, Ni, et al. "A foreground mask network for cell counting." *2020 IEEE 5th international conference on image, vision and computing* (*ICIVC*). IEEE, Aug. 26, 2020. pp. 128-132.

Joao, L. D. M., et al. "A Flyweight CNN with Adaptive Decoder for *Schistosoma mansoni* Egg Detection." *arXiv preprint* (Jun. 26, 2023). pp. 1-7.

Extended European Search Report issued Dec. 20, 2024 in counterpart European Patent Application No. 24192688.0. (9 pages in English).

Ofir, Nati, et al., "Defect Detection Approaches Based on Simulated Reference Image", *arXiv preprint arXiv:2303.11971*, Mar. 21, 2023, (5 Pages in English).

Extended European Search Report Issued on Apr. 10, 2025, in Counterpart European Patent Application No. 24192688.0 (10 pages in English).

* cited by examiner

METHOD AND DEVICE WITH IMAGE-DIFFERENCE REDUCTION PREPROCESSING

CROSS-REFERENCE TO RELATED APPLICATIONS

This application claims priority to and the benefit of Korean Patent Application No. 10-2023-0101678 filed in the Korean Intellectual Property Office on Aug. 3, 2023, the entire disclosure of which is incorporated herein by reference for all purposes.

BACKGROUND

1. Field

The present disclosure relates to a method and device with image-difference reduction preprocessing.

2. Description of Related Art

Inspection of electronic devices for defects, for example, is an important procedure used to reduce equipment malfunctions and process accidents in various fields. To detect the defects from image data of the electronic device, a defect signal may be extracted therefrom.

The defect signal may be extracted from a difference image of a difference between a reference image of a specific image of the electronic device and the specific image. The defect signal may not be extracted properly due to high background noise (Low SNR), at least as compared to a fine defect signal. As a result, performance of a defect inspection system may be sub-optimal.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method is performed by one or more processors, the method is for preprocessing a source image, and the method includes: generating a feature map by applying at least one kernel to the source image; generating a first reconstructed source image by applying at least one mask to the feature map, the feature map corresponding to the source image; and updating the kernel based on a value of a loss function between the first reconstructed source image and a target image.

The at least one kernel may include a foreground kernel and a background kernel, and the generating of the feature map may include: applying the foreground kernel to the source image; and applying the background kernel to the source image.

The feature map may include a first feature map generated by the applying the foreground kernel to the source image and a second feature map generated by the applying the background kernel to the source image, and the generating of the first reconstructed source image may include: applying a foreground mask to the first feature map; and applying a background mask to the second feature map.

The generating of the first reconstructed source image may further include: forming a first image by applying the foreground mask to the first feature map; forming a second image by applying the background mask to the second feature map; and combining the first image with the second image.

The method may further include: generating a second reconstructed source image by applying an updated version of the kernel and the mask to the source image, the updated version of the kernel being generated based on the kernel being updated according to the value of the loss function; and determining whether to finish updating the kernel based on the second reconstructed source image being generated.

The determining of whether to finish updating the kernel may include updating the updated kernel based on a value of a loss function between the second reconstructed source image and the target image or finishing training through the update of the kernel.

The determining of whether to finish updating of the kernel may include finishing training through the updating of the kernel based on the source image being reconstructed by a predetermined number of times.

The method may further include preprocessing the source image by using a trained background kernel based on the finishing of the updating of the kernel being determined.

In another general aspect, a method for detecting a defect in a defect image that has a corresponding reference image without the defect, the method performed by one or more processors and including: applying a trained background kernel to the reference image to generate a preprocessed reference image, the trained background kernel being trained based on applying a background kernel and a mask to the reference image; and detecting the defect in the defect image based on a comparison between the preprocessed reference image and the defect image.

The method may further include: outputting a feature map by applying the background kernel to the reference image, applying the mask to the feature map to generate a reconstructed reference image that is a reconstruction of the reference image; and updating the background kernel based on the reconstructed reference image.

The outputting of the feature map may include: applying a foreground kernel to the reference image; and applying the background kernel to the reference image.

The applying the foreground kernel to the reference image may generate a first feature map of the feature map, the applying the background kernel to the reference image may generate a second feature map of the feature map, and the reconstructing of the reference image may include: applying a foreground mask of the mask to the first feature map to generate a first masked feature map; applying a background mask of the mask to the second feature map to generate a second masked feature map; and reconstructing the reference image based on a combination of the first masked feature map and the second masked feature map.

In another general aspect, a device for preprocessing a reference image includes: one or more processors; memory storing instructions configured to cause the one or more processors perform a process including: generating a feature map by applying a kernel to the reference image; generating a first reconstructed reference image by applying a mask to the feature map, the feature map corresponding to the reference image; and updating the kernel based on a value of a loss function between the first reconstructed reference image and a defect image.

The kernel may include a foreground kernel and a background kernel, and generating the feature map may include applying the foreground kernel to the reference image and applying the background kernel to the reference image.

The mask may include a foreground mask and a background mask, and the generating the first reconstructed reference image may include forming a first masked image by applying the foreground mask to a feature map output by the foreground kernel and forming a second masked image by applying the background mask to a feature map output by the background kernel.

The first reconstructed reference image may be generated based on a combination of the first masked image and the second masked image.

The mask may include a background mask that corresponds to a foreground-background segmentation of the reference image.

The foreground mask may be trained based on the value of the loss function.

The foreground mask may be generated by applying a foreground-background segmentation model or rule to the reference image.

The kernel may include a background kernel and the first reconstructed reference image has reduced background noise.

Figure 1:
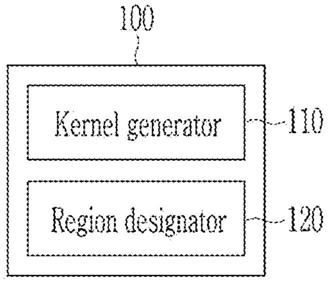
FIG. 1 illustrates a preprocessing device, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates a preprocessing system, according to one or more embodiments.

A source image and a target image (a training pair) may each include a foreground and a background of a same scene or subject. The foreground may correspond to a region of interest (ROI) and the background may be another portion exclusive of the ROI. Regarding the source image and the target image, generally, differences between the backgrounds of the respective source and target images are small (the backgrounds may be close to identical), however, differences between the foregrounds (the ROIs) of the respective images may be greater, i.e., the foregrounds may not be close to identical. When the target image is, for example, a defect image (includes a defect of an electronic device or other workpiece), the source image may serve as a reference image (ground truth image) that lacks the defect and that can be compared to the defect image in detecting the defect in the target image.

In an embodiment, a preprocessing system 100 may preprocess the source image to minimize differences between the backgrounds of the source image and the target image. For example, the preprocessing system 100 may de-noise (reduce) noise in a difference between the preprocessed source image and the target image, thereby increasing a signal to noise ratio (SNR) of the difference between the source image and the target image.

For this purpose, given an image training pair of the source image and the target image, the preprocessing system 100 may change the source image so that the source image is closer to the target image. When a region of the target image that is different from the source image is determined to correspond to a defect, a defect inspection device may detect the defect in the target image.

Referring to FIG. 1, the preprocessing system 100 may include a kernel generator 110 and a region designator 120. In an embodiment, the kernel generator 100 and/or the region designator 120 may be provided by a neural network (e.g., convolutional neural network).

The kernel generator 110 may generate a kernel (e.g., a foreground or background kernel) that is then used for processing images. The neural network may update the kernel according to an operation result of an operation on an image by the kernel. In an embodiment, the kernel generator 110 may generate a foreground kernel and a background kernel and may input a same image (source image) to the foreground kernel and the background kernel to train the neural network (see FIG. 6). The background kernel, as updated through learning of the neural network, may be used by the neural network in generating a preprocessed image in a non-training inferring phase (for defect detection in a production/non-training image). In contrast, the trained foreground kernel may not be used in the inferring phase.

Further regarding training, the region designator 120 may generate a mask for distinguishing/separating a background region and a foreground region in an image and may update the mask according to a result of the neural network applying the mask to the image. In an embodiment, the region designator 120 may generate a foreground mask and a background mask and may respectively apply the foreground mask and the background mask to an image (e.g., source image) to train the neural network. The foreground kernel may be used to train the foreground mask and the background kernel may be used to train the background mask. That is, the kernel applied to the image (mentioned earlier) may be trained according to the foreground region and background region determined by the region designator 120.

The region designator 120 may generate the mask of the training image (e.g., source image) according to a binary method by which the pixels of the mask (which respectively correspond to the pixels of the image) initially have binary values of 0 or 1. The pixel values of the mask may then be updated to have numeric values ranging from 0 to 1.

The region designator 120 may also generate a second mask (e.g., foreground) from a first mask (e.g., background) by generating one first mask (e.g., background) and then generating an a copy of the first mask and inverting the copied mask thus forming the second mask (e.g., foreground). For example, the region designator 120 may generate the foreground mask by first generating the background mask and then (in a copy of the background mask) subtracting respective pixel values of the background mask from 1. When the pixel value of a specific pixel of the background mask is 0.95, for example, the pixel value of a corresponding pixel of the foreground mask may be 0.05. Alternatively, the region designator 120 may generate the background mask by generating the foreground mask and subtracting the respective pixel values of the generated foreground mask from 1.

Figure 2:
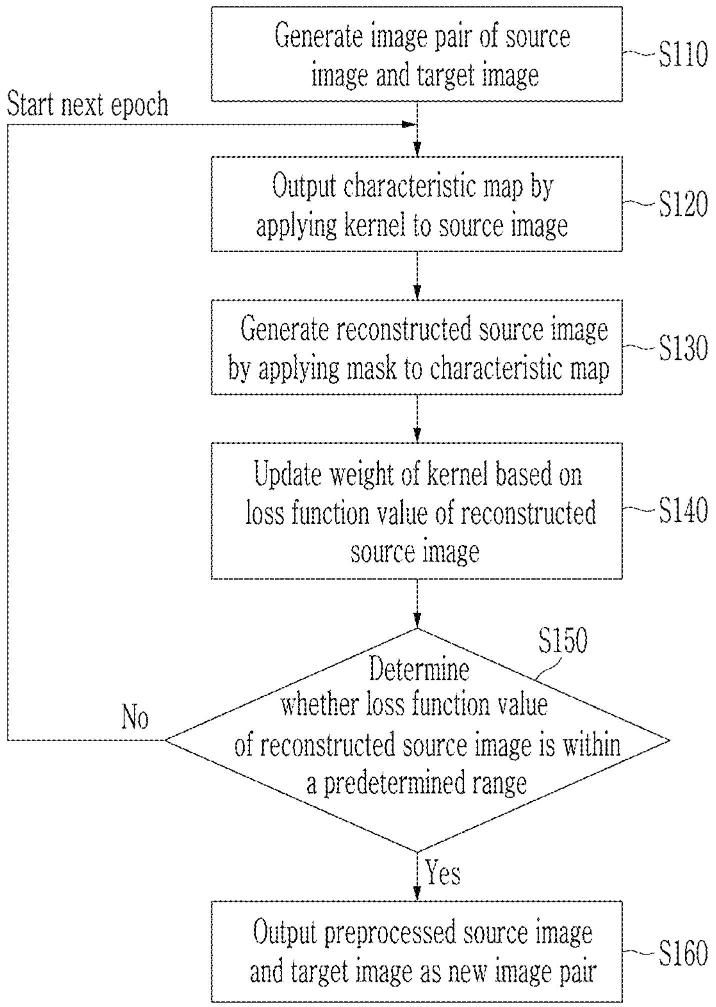
FIG. 2 illustrates a method of training for preprocessing an image, according to one or more embodiments.
Figure 3:
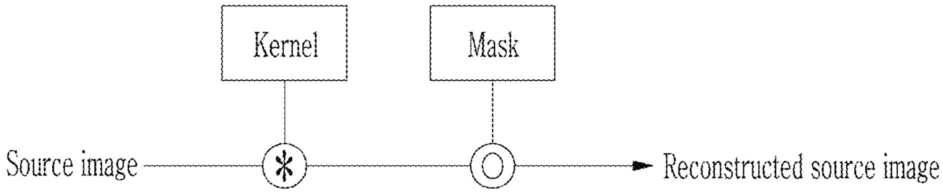
FIG. 3 illustrates a training method of a preprocessing system, according to one or more embodiments.
Figure 4:
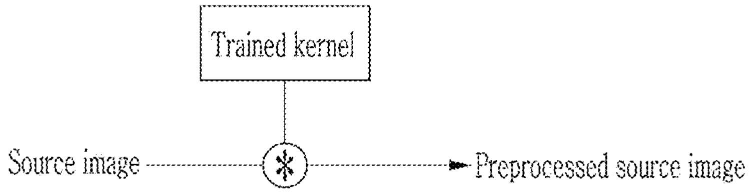
FIG. 4 illustrates an inferring method performed through a trained kernel, according to one or more embodiments.

FIG. 2 illustrates training of preprocessing an image through a neural network, according to one or more embodiments. FIG. 3 illustrates a method of training a neural network, according to one or more embodiments. FIG. 4 illustrates a method of inferring through a trained kernel, according to one or more embodiments.

In an embodiment, for a training pair (a source image and a target image) the preprocessing system 100 may generate a reconstructed source image (i.e., a reconstructed version of the source image) by applying filters (e.g., a kernel) to the source image and may update weights of the filters to minimize a value of a loss function computed from the reconstructed version of the source image (as compared to the target image). The source image may be repeatedly reconstructed by correspondingly updated filters until a predetermined criteria (e.g., a maximum number of iterations or minimum degree of loss) is satisfied. The weights may be updated by backpropagation, for example.

In an embodiment, the loss function may be expressed as a function for indicating a difference between the reconstructed source image and the target image. The filters may include a kernel and a mask (multiple of each are possible).

Referring to FIG. 2 and FIG. 3, to summarize, the kernel and the mask may be applied to the source image to generate the reconstructed version of the source image. The loss function may be calculated by the difference between the reconstructed source image and the target image, and then the weights of the kernel and/or the mask may be updated according to the value of the loss function.

To further summarize, based on completion of the updating of the kernel and/or the mask, the preprocessing system 100 may generate the preprocessed image from the source image in the inferring phase, which uses the updated filter. Referring to FIG. 2 and FIG. 4, as the trained kernel is applied to the source image in the inferring phase, the thus-preprocessed source image may be generated. As the difference between the background of the preprocessed source image and the background of the target image is minimized by the preprocessing using the trained kernel, the region of interest may be more accurately determined (due to improved SNR) in the target image from the preprocessed source image.

In detail, referring to FIG. 2, when the image pair of the source image and the target image is generated (S110), the preprocessing system 100 may output a feature map (or characteristic map) of the source image by applying the kernel to the source image (S120).

In an embodiment, the feature map may be generated by a convolutional operation (indicated by the "*" in FIG. 3) of the kernel image on the source image. When the kernel is smaller than the source image, the kernel may perform an operation on the respective pixel values of an image according to a stride with a predetermined stride size. That is to say, the kernel may be convolved over the image. The preprocessing system 100 may adjust a size of the stride and a padding attached to the source image so that the feature map may be output with the same size as the source image.

In an embodiment, the kernel applied to the source image may be an n×n kernel generated by the neural network or by a Gaussian kernel.

Referring to FIG. 2, the preprocessing system 100 may generate the reconstructed version of the source image by applying the mask to the feature map output by the kernel (S130). Referring to FIG. 3, a product operation (indicated by the "○" in FIG. 3) may be performed on the feature map and the mask. For example, pixels in the feature map may be multiplied by the their respectively corresponding counterpart pixels in the mask.

Referring to FIG. 2, the preprocessing system 100 may update the weight of the kernel based on the value of the loss function computed from the reconstructed source image (S140). In an embodiment, the mask may be generated by the neural network or a predetermined rule. When the mask is generated by a neural network, the preprocessing system 100 may update the weight of the mask based on the value of the loss function computed from the reconstructed source image. When the mask is generated according to a predetermined rule, the mask may not be updated. Equation 1 expresses minimization of a loss function for the difference between the reconstructed source image ($S_{Rec}$) and the target image (T).

$$\text{Minimize } L1 \text{ Loss } (|S_{rec} - T|) \qquad \text{Equation 1}$$

Referring to FIG. 2, the preprocessing system 100 may determine whether a latest iteration has caused the value of the loss function (computed from the reconstructed source image) to be within a predetermined range and may thus determine whether to re-perform the training (S150). For example, when the value of the loss function computed from the reconstructed source image is not within the predetermined range, the preprocessing system 100 may start a next epoch of the training or when the value of the loss function computed from the reconstructed source image is within the predetermined range, the preprocessing system 100 may finishing the training. Alternatively, when a predetermined number of the epochs have been performed (e.g., for the purpose of quick processing), the preprocessing system 100 may terminate the training and the kernel becomes available for performing an inferring phase.

In the inferring phase, the preprocessing system 100 may generate the preprocessed source image by applying the trained kernel to the source image and output the thus-preprocessed source image and the target image as a new image pair (S160).

Figure 5:
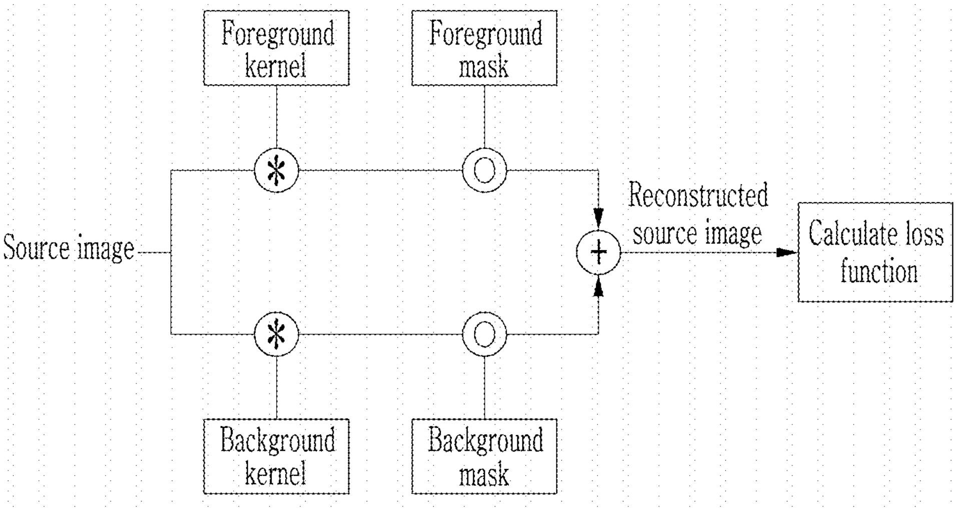
FIG. 5 illustrates training of a preprocessing system, according to one or more embodiments.

FIG. 5 illustrates a training method of a neural network, according to one or more embodiments.

Referring to FIG. 5, the reconstructed source image may be generated by applying the kernels and the masks to the same source image and then combining respective feature maps obtained by applying the kernels and the masks to the source image.

The preprocessing system 100 may apply the foreground kernel and the foreground mask to the source image and may apply the background kernel and the background mask to the source image.

In an embodiment, the foreground kernel may be applied to the source image, a first feature map of the source image may be output, and the foreground mask may be applied to the first feature map produced by the foreground kernel, thus updating the first feature map. Further, the background kernel may also be applied to the source image, thus forming a second feature map of the source image, and the background mask may be applied to the second feature map produced by the background kernel. In this way, the foreground mask and the background mask may allow the foreground kernel and the background kernel to learn the foreground and the background of the source image, respectively.

The kernel generator 110 may apply a predetermined condition to generate the foreground kernel and the background kernel in a fixed way. The predetermined condition of the kernel generator 110 may be as expressed in Equation 2.

$$\text{Minimize} \lfloor \mu_{|S*Kernel_{BG}-S|} - \mu_{|S*Kernel_{FG}-S|} + \epsilon \rfloor \qquad \text{Equation 2}$$

Referring to Equation 2, μ is a mean value, S is a source image, and ∈ is a margin.

In an embodiment, for a set of source-target image pairs, when the difference between the source images and their corresponding target images generally fall within a predetermined image region (e.g., a region where defects commonly occur), a rule-based mask may be used. For example, when the location of the differences between the source images and the target images is predetermined to be generally provided in a 7×7 region with a location near the middle of the image, the foreground mask may pass-through only/primarily a portion of the first feature map that is in the 7×7 region (that is in the middle of the image) and the background mask may pass-through only/primarily a portion of the second feature map that is exclusive of the 7×7 region.

In another embodiment, the foreground masks may be applied before the foreground kernels are applied (in FIG. 5, the positions of the kernels may be swapped with the positions of the masks). That is to say, the source image is applied to the foreground mask and that result is then applied to the foreground kernel. Similarly, the source image is applied to the background mask, and that result is applied to the background kernel. The preprocessing system 100 may combine the two images (feature maps) outputted from the foreground kernel and the background kernel, respectively, and may generate the reconstructed source image (the combination).

The preprocessing system 100 may update the weights of the foreground kernel and the background kernel based on the value of the loss function (a loss function for indicating differences between reconstructed source images and corresponding target images). The preprocessing system 100 may update the foreground mask and/or the background mask based on the value of the loss function computed from the reconstructed source image.

The preprocessing system 100 may update the foreground mask and/or the background mask based on the value of the loss function computed from the reconstructed source image. In a non-limiting example, the foreground mask may be updated based on the value of the loss function and then the background mask may be updated by inverting the foreground mask (e.g., subtracting the foreground mask from 1). For example, in a case when the foreground mask can be updated more easily than the background mask based on the value of the loss function, the foreground mask may be updated based on the value of the loss function, and then the background mask may be updated by inverting the foreground mask. Alternatively, in a case when capacity of the foreground mask is less than capacity of the background mask, the foreground mask may be updated based on the value of the loss function, and then the background mask (which will be used for the next epoch) may be the inverted foreground mask.

The preprocessing system 100 may determine whether to start the training again based on a determination of whether the value of the loss function computed from the reconstructed source image is in a predetermined range (or satisfies a threshold). For example, when the value of the loss function is not within the predetermined range, the preprocessing system 100 may start the next epoch. However, when the value of the loss function is within the predetermined range, the preprocessing system 100 may finish the training. Alternatively, when the epoch is performed for a predetermined number of times, the preprocessing system 100 may finish the training and may output a trained background kernel for performing the inferring phase.

Figure 6:
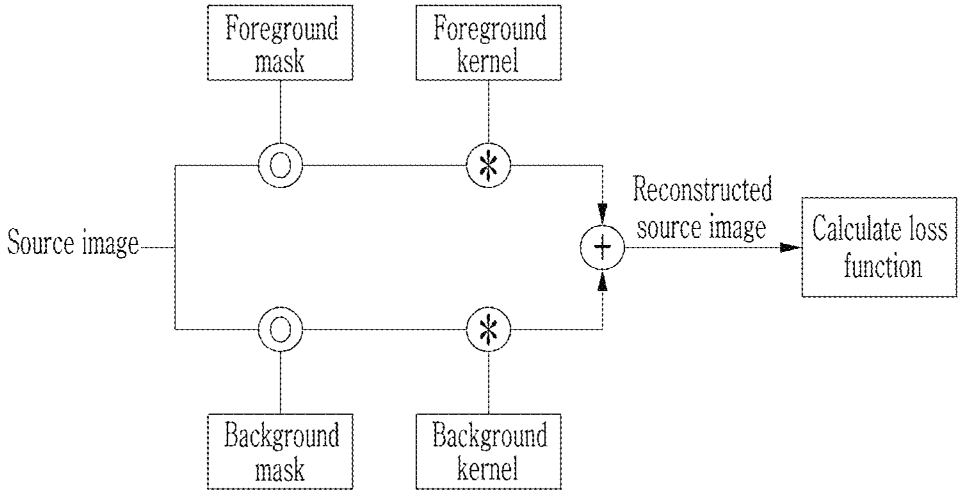
FIG. 6 illustrates training of a preprocessing system according to some embodiments.

FIG. 6 illustrates a method of training a neural network, according to one or more embodiments.

Referring to FIG. 6, a mask and a kernel are applied to the same source image, and the images/maps output by the masks and kernels are combined so the source image is reconstructed.

The preprocessing system 100 may apply the foreground mask and the foreground kernel to the source image and may also apply the background mask and the background kernel to the source image.

In an embodiment, the foreground mask may be applied to the source image and the result thereof may be applied to the foreground kernel so that the feature map is outputted from the foreground kernel. Further, the background mask may be applied to the source image and a result thereof may be applied to the background kernel so that the feature map is outputted from the background kernel. By this, the foreground kernel and the background kernel may learn a portion filtered by the foreground mask and the background mask.

The preprocessing system 100 may combine the two feature map images output by the foreground kernel and the background kernel and may generate one reconstructed source image. Because the mask is applied before the kernel, an additional element may be included in the preprocessing system 100 for correcting distortion that may be generated in the respective regions (the foreground and the background) of the feature map image. For example, the preprocessing system 100 may further include a boundary processing device and/or a neural network (not shown) for processing the boundary of the foreground and the background.

The preprocessing system 100 may update the weights of the foreground kernel and/or the background kernel based on the value of the loss function for indicating the difference between the reconstructed source image and the target image. The preprocessing system 100 may update the foreground mask and/or the background mask based on the value of the loss function computed from the reconstructed source image.

The preprocessing system 100 may update the foreground mask and/or the background mask based on the value of the loss function of the reconstructed source image. For example, the foreground mask may be updated based on the value of the loss function and the background mask may be updated by inverting the foreground mask. When the capacity of the foreground mask is less than the capacity of the background mask, the foreground mask may be updated based on the value of the loss function and the background mask (which will be used for the next epoch) may be the inverted foreground mask.

The preprocessing system 100 may determine whether to start the training again based on a determination of whether the value of the loss function computed from the reconstructed source image is in a predetermined range or satisfies a threshold. For example, when the value of the loss function is not within the predetermined range, the preprocessing system 100 may start the next epoch. When the value of the loss function is within the predetermined range, the preprocessing system 100 may terminate the training. Alternatively, when the predetermined number of the epochs are performed, the preprocessing system 100 may terminate the training and may output the trained background kernel for performing the inferring phase.

Figure 7:
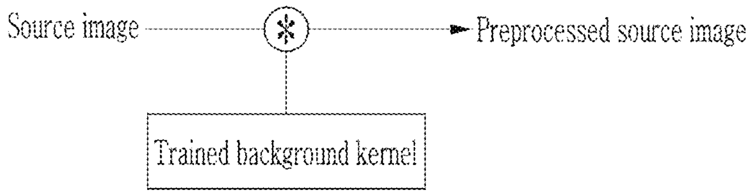
FIG. 7 illustrates an inferring method performed through a trained kernel, according to one or more embodiments.

FIG. 7 illustrates an inferring method through a trained kernel according to some embodiments.

Referring to FIG. 7, the preprocessing system 100 may generate a preprocessed source image by applying a trained background kernel to a source image. The background kernel may be trained by any of the examples or embodiments described above. In an embodiment, when the source image is reconstructed, the preprocessing system 100 may determine whether to terminate the updating of the kernel. The preprocessing system 100 may update the kernel again based on the value of the loss function between the reconstructed source image and the target image or may finish the training performed through the update of the kernel. Alternatively, when the source image is reconstructed by the predetermined number of times, the preprocessing system 100 may terminate the training performed through the update of the kernel.

When the training is finished, the preprocessing system 100 may preprocess the source image in the inferring phase by applying the trained background kernel to the source image. The preprocessed source image may be used in detecting a defect in the target image.

Figure 8A:
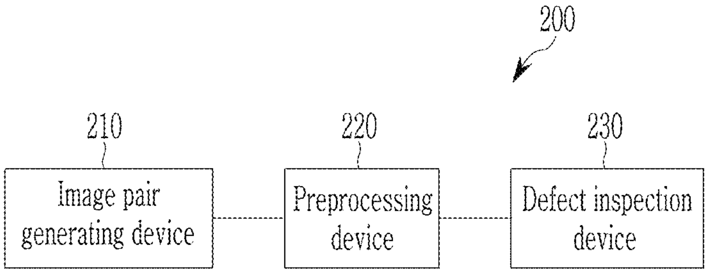
FIG. 8A illustrates a defect inspecting system for an electronic device, according to one or more embodiments.
Figure 8B:
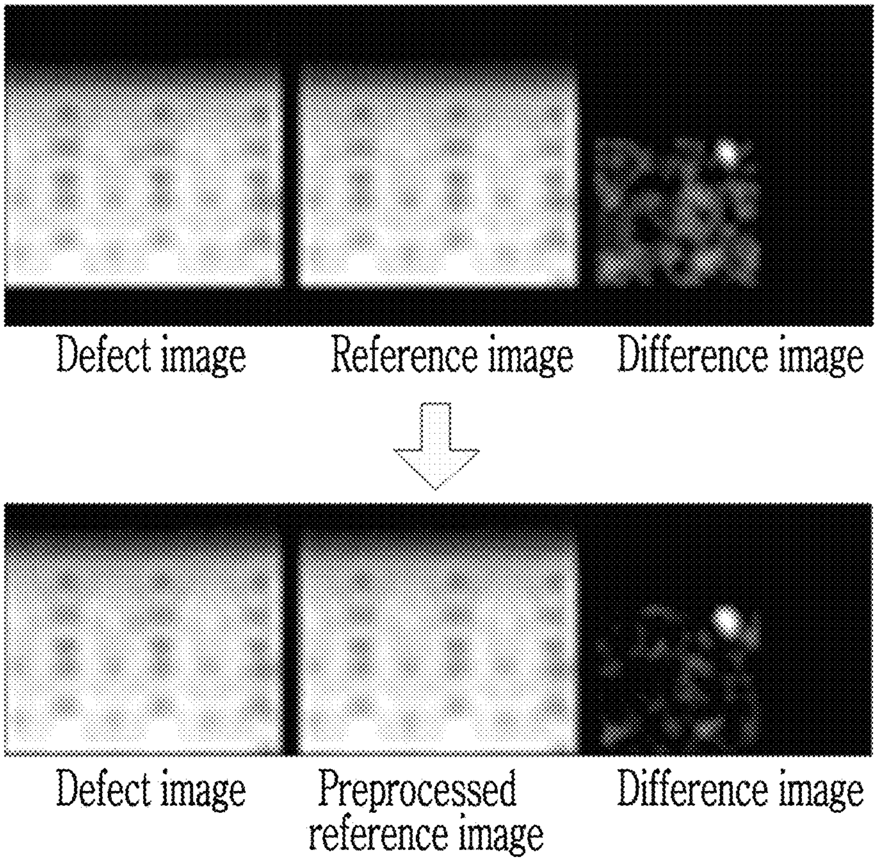
FIG. 8B illustrates a defect distinguished in an image by a defect inspecting system, according to one or more embodiments.

FIG. 8A illustrates a defect inspecting system for an electronic device, according to one or more embodiments. FIG. 8B illustrates a defect distinguished in an image by a defect inspecting system according to one or more embodiments.

In an embodiment, a defect inspecting system 200 may photograph the electronic device to obtain a defect image and may determine defects in the defect image by using a reference image corresponding to the defect image. The reference image may be an image of the electronic device including no defect (not necessarily the same physical electronic device, but rather a copy). The defect inspecting system 200 may be applied in the field of defect detection using defect data and reference data. For example, the defect inspecting system 200 may be used in the semiconductor manufacturing process.

Referring to FIG. 8A, the defect inspecting system 200 may include an image pair generating device 210, a preprocessing device 220, and a defect inspection device 230.

The image pair generating device 210 may obtain the defect image by photographing a suspected defect portion of the electronic device and may generate an image pair of the defect image and the reference image, where the reference is generated as corresponding to the defect image.

Specifically, the preprocessing device 220 may convert the reference image (corresponding to the defect image) into a reconstructed reference image by using filters and may generate a preprocessed version of the reference image in which noise of the background of the reference image is removed or reduced based on differences between the reconstructed reference image and the defect image. The filters may include at least one kernel and at least one mask.

In an embodiment, the preprocessing device 220 may apply the background kernel and the foreground kernel to the reference image and may apply the background mask and the foreground mask to the feature maps respectively output by the background kernel and the foreground kernel. The preprocessing device 220 may apply the background mask to the feature map output by the background kernel and may apply the foreground mask to the feature map output by the foreground kernel. The reference image may be reconstructed by combining the two images/maps masked by the background mask and the foreground mask. The preprocessing device 220 may update (train) the background kernel and the foreground kernel based on the value of the loss function on the differences between the reconstructed reference image and the defect image. Then, for continued training, the previously-updated kernel may be applied again to the reference image to reconstruct the reconstructed reference image and the previously-updated kernel may be updated again based on the re-reconstructed reference image. When the update of the kernel is finished, in the inferring phase the preprocessing device 220 may apply the updated background kernel to the reference image to generate a thus-preprocessed version of the reference image.

The defect inspection device 230 may detect the defect from the defect image by comparing the preprocessed reference image and the defect image.

Referring to FIG. 8B, it can be seen from the difference image (which is a difference between the preprocessed reference image and the defect image), as compared to a difference with the non-preprocessed reference image, that the difference of the background of the preprocessed reference image is reduced, as indicated by the generally darker (non-difference) areas and by the prominence/brightness of the region identified as the defect. The lower background difference between the preprocessed reference image and the defect image gives greater prominence (signal strength) to the difference are of the defect.

Figure 9:
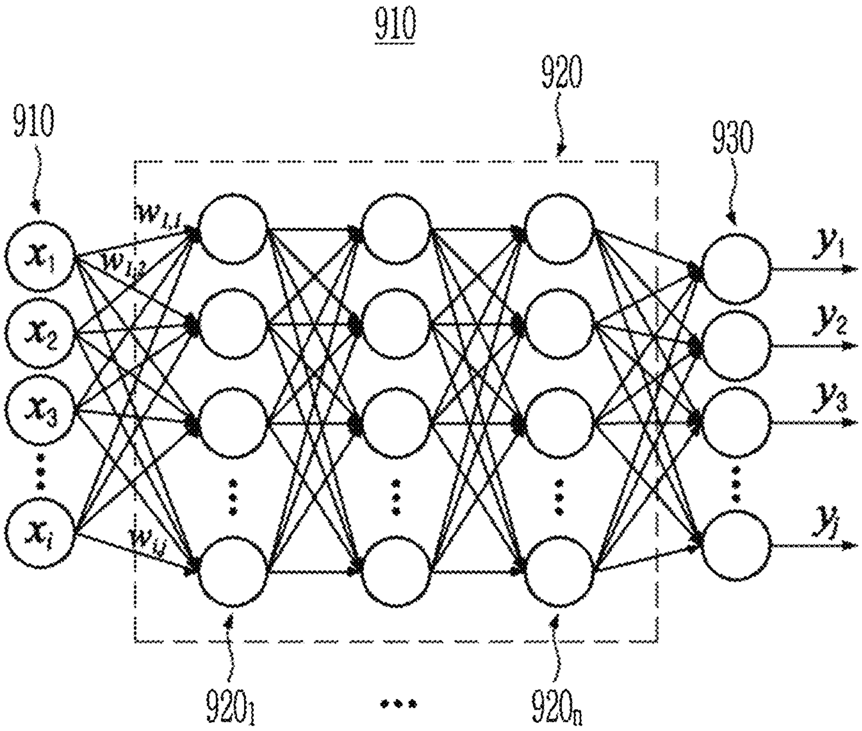
FIG. 9 illustrates a neural network, according to one or more embodiments.

FIG. 9 illustrates a neural network, according to one or more embodiments.

Referring to FIG. 9, the neural network (NN) 900 may include an input layer 910, a hidden layer 920, and an output layer 930. The input layer 910, the hidden layer 920, and the output layer 930 may each include a respective set of nodes, and strength of connections between the nodes may correspond to a weight (a connection weight). The nodes included in the input layer 910, the hidden layer 920, and the output layer 930 may be connected to each other with a fully connected type of architecture. The number of parameters (a weight and a bias) may be equal to the number of the connections in the neural network 900.

The input layer 910 may include input nodes ($x_1$ to $x_i$), and the number of the input nodes ($x_1$ to $x_i$) may correspond to the number of independent input variables. Based on a training data set being input to the input layer 910 for the purpose of training the neural network 900 and a test data set being input to the input layer 910 of the trained neural network 900, the output layer 930 of the trained neural network 900 may output an inferring/inference result.

The hidden layer 920 may be positioned between the input layer 910 and the output layer 930 and may include at least one hidden layer (920$_1$ to 920$_n$). The output layer 930 may include at least one output node ($y_1$ to $y_j$). An activation function may be used in the hidden layer 920 and the output layer 930 to determine node outputs/activations. In an embodiment, the neural network 900 may be learned by updating the weights of the hidden nodes included by the hidden layer 920.

Figure 10:
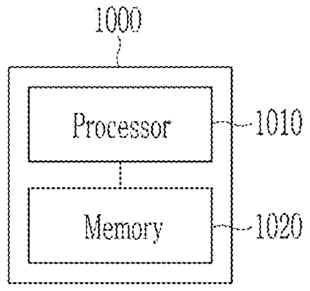
FIG. 10 illustrates a preprocessing device, according to one or more embodiments.

FIG. 10 illustrates a preprocessing device, according to one or more embodiments.

The preprocessing device may be implemented as a computer system, for example, a computer readable medium (but not a signal per se). Referring to FIG. 10, the computer system 1000 may include at least one processor 1010 and at least one memory 1020. The memory 1020 may be connected to the processor 1010 and may store various information for driving the processor 1010 or at least one program executed by the processor 1010.

The processor 1010 may implement functions, stages, or methods proposed in the embodiments. An operation of the computer system 1000 may be implemented by the processor 1010. The at least one processor 1010 may include at least one of CPU, GPU, and NPU. In practice the processor 1010, may be one or more processors of one or more types.

The memory 1020 may be provided inside and/or outside the processor and may be connected to the processor through various known means. The memory may represent a volatile or non-volatile storage medium in various forms, and for example, the memory may include a read-only memory (ROM) and a random access memory (RAM).

The computing apparatuses, the electronic devices, the processors, the memories, the image sensors, the displays, the information output system and hardware, the storage devices, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method, performed by one or more processors, for preprocessing a source image, the method comprising:

generating a feature map by applying at least one kernel to the source image;

generating a first reconstructed source image by applying at least one mask to the feature map, the feature map corresponding to the source image; and updating the at least one kernel based on a value of a loss function between the first reconstructed source image and a target image, wherein the at least one kernel comprises a foreground kernel and a background kernel, and wherein the generating of the feature map comprises:

applying the foreground kernel to the source image, and applying the background kernel to the source image, wherein the feature map comprises a first feature map generated by the applying the foreground kernel to the source image and a second feature map generated by the applying the background kernel to the source image, and wherein the generating of the first reconstructed source image comprises:

applying a foreground mask to the first feature map; and applying a background mask to the second feature map.

2. The method of claim 1, wherein the generating of the first reconstructed source image further comprises:

forming a first image by applying the foreground mask to the first feature map;

forming a second image by applying the background mask to the second feature map; and combining the first image with the second image.

3. The method of claim 1, further comprising:

generating a second reconstructed source image by applying an updated version of the kernel and the mask to the source image, the updated version of the kernel being generated based on the kernel being updated according to the value of the loss function; and determining whether to finish updating the kernel based on the second reconstructed source image being generated.

4. The method of claim 3, wherein the determining of whether to finish updating the kernel comprises updating the updated kernel based on a value of a loss function between the second reconstructed source image and the target image or finishing training through the update of the kernel.

5. The method of claim 3, wherein the determining of whether to finish updating of the kernel comprises finishing training through the updating of the kernel based on the source image being reconstructed by a predetermined number of times.

6. The method of claim 3, further comprising preprocessing the source image by using a trained background kernel based on the finishing of the updating of the kernel being determined.

7. A device for preprocessing a reference image, the device comprising:

one or more processors;

memory storing instructions configured to cause the one or more processors perform a process comprising:

generating a feature map by applying a kernel to the reference image;

generating a first reconstructed reference image by applying a mask to the feature map, the feature map corresponding to the reference image; and updating the kernel based on a value of a loss function between the first reconstructed reference image and a defect image, wherein the kernel comprises a foreground kernel and a background kernel, wherein generating the feature map comprises applying the foreground kernel to the reference image and applying the background kernel to the reference image, wherein the mask comprises a foreground mask and a background mask, and wherein the generating the first reconstructed reference image comprises forming a first masked image by applying the foreground mask to a feature map output by the foreground kernel and forming a second masked image by applying the background mask to a feature map output by the background kernel.

8. The device of claim 7, wherein the first reconstructed reference image is generated based on a combination of the first masked image and the second masked image.

9. The device of claim 7, wherein the mask comprises a background mask that corresponds to a foreground-background segmentation of the reference image.

10. The device of claim 9, wherein the foreground mask is trained based on the value of the loss function.

11. The device of claim 9, wherein the foreground mask is generated by applying a foreground-background segmentation model or rule to the reference image.

12. The device of claim 7, wherein the kernel comprises a background kernel and wherein the first reconstructed reference image has reduced background noise.

* * * * *